Barney & Berry,
Skate,
No. 3,007. Reissued June 30, 1868.
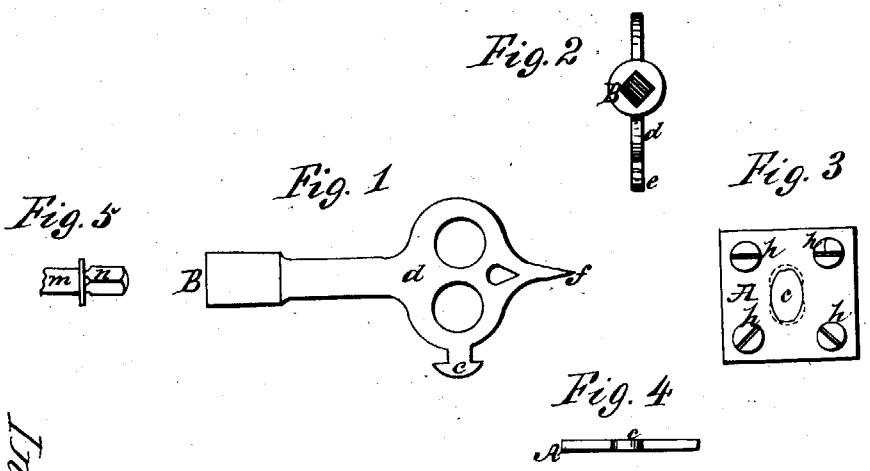
Witnesses;
W. F. Kilburn
Ogden Griswold
Inventor;
E. H. Barney
John Berry

UNITED STATES PATENT OFFICE.

E. H. BARNEY AND JOHN BERRY, OF SPRINGFIELD, MASSACHUSETTS.

IMPROVED SKATE-FASTENER.

Specification forming part of Letters Patent No. 66,935, dated July 23, 1867; Reissue No. 3,007, dated June 30, 1868.

*To all whom it may concern:*

Be it known that we, E. H. BARNEY and JOHN BERRY, of Springfield, in the county of Hampden and Commonwealth of Massachusetts, have invented a new and useful Improved Skate Fastener or Key; and we do hereby declare that the following is a full, clear, and exact description thereof, reference being had to the accompanying drawings, and to the letters of reference marked thereon, making a part of this specification, in which—

Figure 1 is a side view of the key. Fig. 2 is an end view. Fig. 3 is a plan of a heel-templet, and Fig. 4 is a vertical section through line C D of Fig. 3.

The nature of our invention consists in arranging in one instrument the different articles used to assist in securing a skate to the boot, so that the instrument shall be compact and convenient to be carried in the pocket.

In the skate manufactured by us and known in the market as the "New York Club Skate," and also in other skates, the heel-plate is provided with a button which is of nearly the same shape as the button *e*, Fig. 1. The templet A is inserted in the heel of the boot, and secured therein by the screws *h h*, the opening *c* running longitudinally with the length of the boot.

When the skate is to be adjusted to the boot the skate is held at a right angle to the length of the boot, the button upon the heel of the skate is inserted in the aperture *c* of the templet A, and the skate is then turned parallel to and placed upon the forward part of the boot, and is secured to the boot by clamps operated by a screw, *m*, having a square or prismatic head, *n*. The under edge of the aperture *c* of the templet A at each end of the aperture is rounded off, while at the middle of the aperture the corner is left on. This rounding of the under edge of the aperture *c*, as shown by dotted lines around the aperture *c*, is necessary, in order to properly and firmly secure the heel of the skate to the boot, and acts as a cam to draw the button upon the heel-plate of the skate up into the templet tightly, and keeps the skate in place upon the boot firmly. In wearing the boot in walking this aperture, being rounded upon the under or inside, easily becomes filled with dirt, ice, or snow, which hardens in the cavity in the heel above the templet, and is difficult to remove. To easily accomplish this, the handle *d* of the key is provided with the point *f*, which may be more or less sharpened, which point *f* is used to cut or dig out the dirt, ice, or snow which may be collected in said cavity, and the button *e* upon the key is then inserted in the aperture *c*, and is turned around therein, which operation more effectually removes any dirt, ice, or snow which could not be removed by the point *f*. The other end of the key or fastener is enlarged, and is provided with the socket B, which is placed upon the prismatic head *n* of the screw *m*, and, by turning the key or fastener, the screw operates the clamps and secures the skate to or detaches it from the boot, as may be desirable.

It is evident that the point *f* or the button *e*, or both, may be made upon any other part of the fastener or key without departing from the principle of its operation; and it is also evident that the whole fastener or key with its point and button may be punched out of sheet-steel or other suitable metal, with the socket or wrench B made flat; or the point *f* and button *e* may be made separate and be properly attached to the main portion of the key, such a construction being merely an equivalent to one made whole, as we claim that the arrangement of the said point *f*, button *e*, and socket or wrench B in one instrument is new.

Having thus described our invention, what we claim as new, and desire to secure by Letters Patent, is—

A skate fastener or key composed of the socket B, point *f*, and button *e*, when made of one or more pieces, substantially as described, and for the purposes specified.

E. H. BARNEY.
JOHN BERRY.

Witnesses:
T. A. CURTIS,
FRED. E. RICE.